(12) United States Patent
Olivera et al.

(10) Patent No.: US 11,336,598 B2
(45) Date of Patent: May 17, 2022

(54) INTEGRATION OF CHAT MESSAGING IN EMAIL

(71) Applicant: VMware, Inc., Palo Alto, CA (US)

(72) Inventors: Rene Jesus Olivera, Hampton, GA (US); Annie Wilson, Chamblee, GA (US); Sri Krishna Chaitanya Yantrapragada, Sandy Springs, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/177,628

(22) Filed: Feb. 17, 2021

(65) Prior Publication Data

US 2021/0176195 A1    Jun. 10, 2021

Related U.S. Application Data

(63) Continuation of application No. 16/411,829, filed on May 14, 2019, now Pat. No. 10,931,608.

(51) Int. Cl.
| | |
|---|---|
| *H04L 51/046* | (2022.01) |
| *H04L 67/1097* | (2022.01) |
| *H04L 9/40* | (2022.01) |
| *G06F 3/0482* | (2013.01) |
| *H04L 51/00* | (2022.01) |
| *H04L 29/06* | (2006.01) |

(52) U.S. Cl.
CPC ............ *H04L 51/046* (2013.01); *H04L 63/08* (2013.01); *H04L 67/1097* (2013.01); *G06F 3/0482* (2013.01); *H04L 51/14* (2013.01); *H04L 51/16* (2013.01)

(58) Field of Classification Search
CPC ....... H04L 51/16; H04L 51/36; H04L 51/046; H04L 67/1097; H04L 63/08; H04L 51/14; H04L 51/22; G06F 3/0482; G06Q 50/01; G06Q 10/107
See application file for complete search history.

(56) References Cited

U.S. PATENT DOCUMENTS

| | | | |
|---|---|---|---|
| 8,577,967 B1* | 11/2013 | Chavez ................ | G06Q 10/107 709/206 |
| 2008/0037726 A1 | 2/2008 | Yao et al. | |
| 2016/0105463 A1* | 4/2016 | Stuntebeck ............. | H04L 51/04 726/1 |
| 2016/0352677 A1* | 12/2016 | Gordon ............... | H04L 12/1818 |
| 2017/0104698 A1* | 4/2017 | Tomczyk .............. | H04L 51/046 |
| 2018/0351901 A1* | 12/2018 | Snider .................... | G06N 20/20 |
| 2020/0311151 A1* | 10/2020 | Menon .................... | H04L 51/36 |

* cited by examiner

*Primary Examiner* — Caroline H Jahnige
(74) *Attorney, Agent, or Firm* — Thomas | Horstemeyer, LLP

(57) ABSTRACT

Disclosed are various approaches for integrating chat conversations with email messages. A user can request to view a received email message exchanged between multiple entities. If there is an established chat conversation associated with the user that is linked to the email message, the user interface including the email message can include a messaging component that can allow a user to view the corresponding chat conversation. The user interface can also include a component that allows the user to initiate a chat conversation with another party included in the email without switching to a third-party service.

20 Claims, 12 Drawing Sheets

INTEGRATION OF CHAT MESSAGING IN EMAIL

CROSS-REFERENCE TO RELATED APPLICATIONS

This application is a continuation of and claims benefit to U.S. patent application Ser. No. 16/411,829 filed on May 14, 2019, the entire contents of which are hereby incorporated herein by reference.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access. Administrators can utilize the management service to oversee the operation of the devices enrolled with or otherwise managed by the service.

Typically, devices such as laptops, tablets, and mobile phones are required to abide by the enterprise policies. Managed devices can also include one or more programs that can access, manage, edit, or perform functions with respect to enterprise data. For example, a user can access email through the one or more programs of a managed device. Situations can occur where a recipient of an email message wants to engage in a conversation with the sender or other recipients of an email message without including all of the parties associated with the email message. For example, if a sender sends an email message that is missing an attachment, the recipient of the email message may want to send a message to only the sender to notify the sender of the missing attachment. In another example, content included in an email message may trigger a question that one recipient may have for another recipient where the question is not relevant or of concern to the other parties included in the email message.

In these situations, a recipient can generate a new email message that is separate from the original email message or email thread or use a third-party service to contact the intended party to discuss the issue or concern. However, if a new email message is generated or a third-party service is used to communicate with the other party, the context associated with the original email message can be lost as the new message is no longer linked to the email message. Further, the conversation can include sensitive subject matter, and if the user communicates with the other party using an unsecure communication channel, such as, a third-party chat service that is not managed by the management service, the sensitive material can be compromised.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to integrating chat conversations with individual email messages or email threads using a single messaging platform. In particular, the present disclosure relates to integrating chat conversations with email messages allowing users to quickly and securely chat with one or more users associated with an email message without creating separate emails or separate chats. By linking the chat conversations with email messages, the context associated with the chat conversations can remain with the email or email thread. In addition, the communication between users can remain secure as the users will be able to discuss sensitive matters with another user within a single secure application or service instead of unsecure third-party services.

Figure 1:
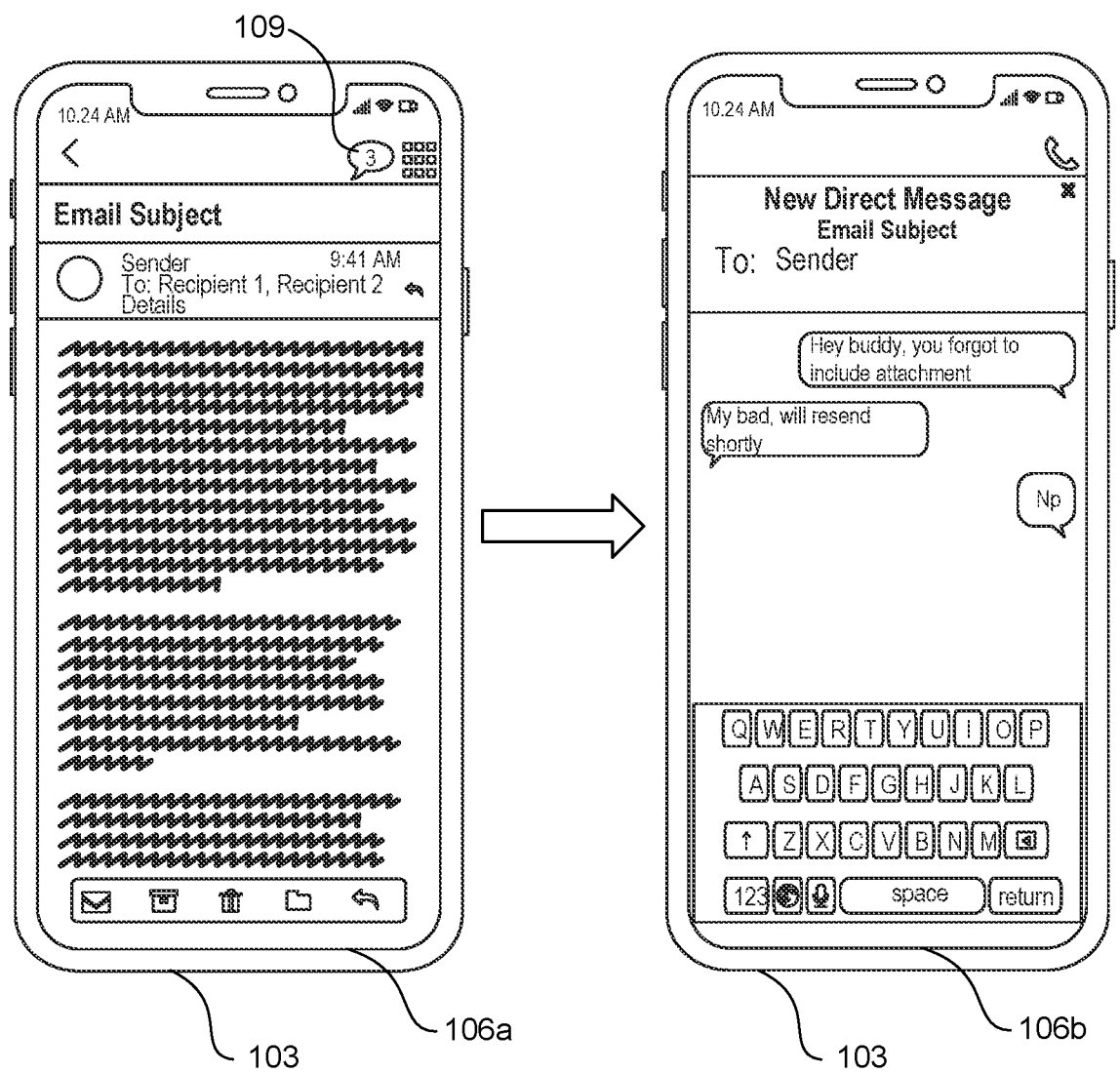
FIG. 1 is an example scenario that illustrates the integration of a chat conversation with an email message.

FIG. 1 illustrates an example scenario of a messaging platform that includes a chat conversation integrated within an email message. As shown in FIG. 1, a user interface 106a displaying an email message is rendered on a display of a client device 103. The user interface 106a can be generated by a client application 218 (FIG. 2) executed on the client device 103. For example, the client application 218 can include an email application or other type of client application that facilitates the sending, viewing, and receiving of emails. The user interface 106a can include a messaging component 109 that, when selected, can provide access to a corresponding chat conversation between two entities included in the email message. In the example of FIG. 1, the email message is exchanged between the Sender, Recipient 1, and Recipient 2. The messaging component 109 indicates that there is a chat conversation established between the recipient (e.g., Recipient 1) and another entity included in the email exchange.

Upon selection of the messaging component 109, the user interface 106b can be rendered by the client device 103 to allow the user to view or otherwise engage with the chat conversation that is associated with the particular email message shown in user interface 106a. The user interface 106b includes a chat conversation and identifies that the chat conversation is between the Sender and Recipient 1. In the example of FIG. 1, the chat conversation relates to the sender forgetting to include an attachment in the email shown in user interface 106a. As this comment is not necessary for all of the parties associated with the email, the chat feature allows the recipient the opportunity to respond to the sender to discuss an issue with the received email without creating an additional email message in the thread.

Figure 2:
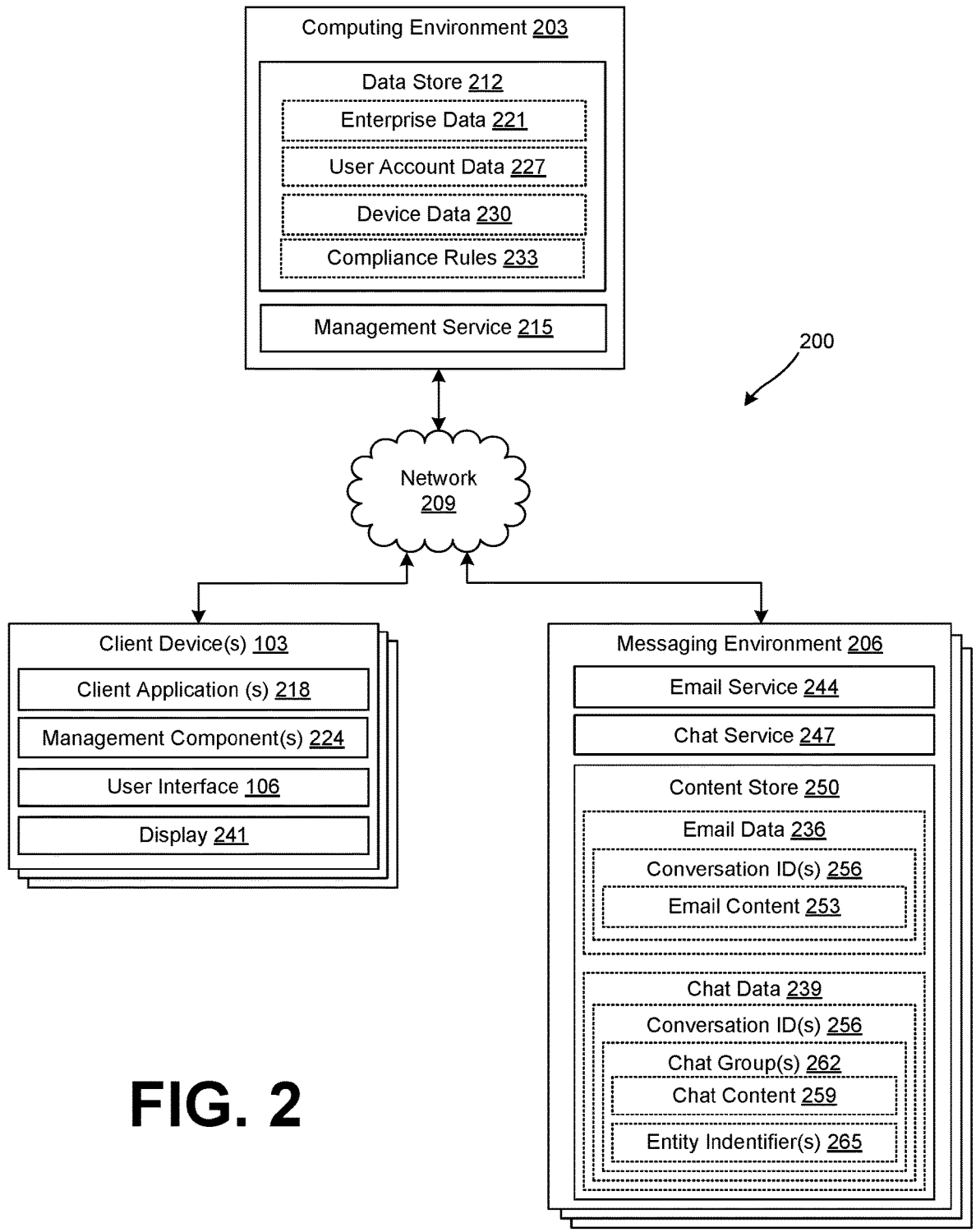
FIG. 2 is a schematic block diagram depicting an example of a network environment.

Beginning with FIG. 2, shown is an example of a networked environment 200. The networked environment 200 includes a computing environment 203, a client device 103, and a messaging environment (s) 206 which are in data communication with each other across a network 209. The network 209 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include, for example, a server computer or any other system providing computing capability. Alternatively, the computing environment 203 can include a plurality of computing devices that are arranged, for example, in one or more server banks, computer banks, or other arrangements. The computing environment 203 can include a grid computing resource or any other distributed computing arrangement. The computing devices can be located in a single installation or can be distributed among many different geographical locations. The computing environment 203 can also include or be operated as one or more virtualized computer instances. For purposes of convenience, the computing environment 203 is referred to herein in the singular. Even though the computing environment 203 is referred to in the singular, it is understood that a plurality of computing environments 203 can be employed in the various arrangements as described above. As the computing environment 203 communicates with the client devices 103 remotely over the network 209, the computing environment 203 can be described as a "remote" or "cloud" computing environment 203.

The computing environment 203 can include a data store 212. The data store 212 can include memory of the computing environment 203, mass storage resources of the computing environment 203, or any other storage resources on which data can be stored by the computing environment 203. The data stored in the data store 212, for example, can be associated with the operation of the various applications or functional entities described below.

The components executed on the computing environment 203 can include, for example, a management service 215 as well as other applications, services, processes, systems, engines, or functionality not discussed in detail herein. The management service 215 can oversee the operation of multiple client devices 103. In some examples, an enterprise, such as one or more companies or other organizations, can operate the management service 215 to oversee or manage the operation of the client devices 103 of its employees, contractors, customers, or other users having user accounts with the enterprise.

The management service 215 can cause various software components to be installed on a client device 103. Such software components can include, for example, client applications 218, resources, libraries, drivers, device configurations and profiles, or other similar components that require installation on the client device 103 as specified by an administrator of the management service 215. The management service 215 can further cause policies to be implemented on a client device 103. Policies can include, for example, restrictions or permissions pertaining to capabilities of a client device 103 such that access to enterprise data 221 is secured on the client device 103.

The management service 215 can interact with one or more client applications 218 executed on the client device 103 to perform management functions. In one example, the management service 215 can interact with a management component 224 on a client device 103 associated with an end user to enroll the client device 103 with the management service 215. The management component 224 can be installed when the client device 103 is enrolled as a managed device with the management service 215. When enrolled, the management component 224 can be registered as a device administrator of the client device 103, which can provide the management component 224 with sufficient privileges to control the operation of the client device 103. In one example, the management component 224 can be registered as the device administrator through the installation of a management profile at the operating system of the client device 103 that causes the operating system to designate the management component 224 as the device administrator.

The management service 215 can direct the management component 224 to perform device management functions on the client device 103. For example, the management service 215 can direct the management component 224 to control access to certain software or hardware functions available on the client device 103. As a result, the management service 215 can verify that the configuration and operation of the client device 103 is in conformance with predefined criteria that ensures that enterprise data 221, or other data, is protected from data loss, unauthorized access, or other harmful events.

The management service 215 can further provision enterprise data 221 to the client device 103 through the management component 224 or the client application 218. In one example, the management service 215 can cause the management component 224 or the client application 218 to control use of the client device 103 or provision enterprise data 221 to the client device 103 through use of a command queue provided by the management service 215. In some examples, the management service 215 can store commands in a command queue associated with a particular client device 103 and accessible by the particular client device 103. In some examples, the management service 215 can transmit an instruction to an original equipment manufacturer (OEM) messaging service specific to the client devices 103 to cause the OEM specific messaging service to send an instruction to the operating systems of the client device 103, which causes the client device 103 to retrieve commands from the command queues provided by the management service 215. In other examples, the management component 224 is executed by such client device 103 to retrieve the contents of the command queue. In one example, the management component 224 or the client application 218 can retrieve the contents of the command queue on a configured interval, such as every four hours, or upon detection of a certain event, such as detection of an unauthorized application being executed by the client device 103. The management service 215 can also push commands to the management component 224 or the client application 218. In any case, the management component 224 or the client application 218 can receive the contents of the command queue from the management service 215.

In another application, the command queue can include a command that the management component 224 or the client application 218 should cause to be executed on the client device 103. In another example, the contents of the command queue can include a resource or other client application 218 that the management component 224 should cause to be installed on the client device 103, which the client device 103 can access through a specified uniform resource locator (URL).

The data stored in the data store 212 can include, for example, enterprise data 221, user account data 227, device data 230, compliance rules 233, as well as other data. Enterprise data 221 includes data associated with the enterprise. The enterprise data 221 can include files that can include images, videos, email, corporate documents, social media, messages, enterprise applications, confidential documents, a spreadsheet, a word processing document, or other enterprise content or communications. Although shown in a separate messaging environment 206 in FIG. 2, the enterprise data 221 can include email data 236, chat data 239, or other data that can be managed by the enterprise. For example, an end user that is enrolled and authenticated with the management service 215 can access the chat data 239 or the email data 236 using the client application 218 or management component 224. However, if an end user is no longer enrolled in the management service 215 or an authentication of the end user fails, the management service 215 can restrict access by the client application 218 or the management component 224 to the chat data 239, email data 236, or other enterprise data 221.

The user account data 227 can include information pertaining to end user of the client devices 103 enrolled with the management service 215. For instance, the user account data 227 can include data used to authenticate an end user, such as a user name, password, email address, biometric data, device identifier, registry identifier, or other data. Additionally, the user account data 227 can include other information associated with an end user, such as name, organization unit, or other information.

The device data 230 can include information about the client device 103. The device data 230 can include, for example, information specifying applications that are installed on the client device 103, configurations or settings that are applied to the client device 103, user accounts associated with the device 103, the physical location of the client device 103, the enterprise associated with the client device 103, the network to which the client device 103 is connected, the device group(s) to which the client device 103 belongs, and other information associated with the client device 103.

The compliance rules 233 include criteria specified by administrators to secure or oversee the operation of client devices 103 enrolled with the management service 215. For instance, administrators can specify criteria for a client device 103 to be in compliance with the management service 215. If a client device 103 is not in compliance with the management service 215, the management service 215 can perform actions predefined by the administrators, such as denying access to enterprise data 221, denying authentication of the client device 103 or the end user of the device 103, reconfiguring a client device 103, notifying an operator of the client device 103, as well as other actions.

The client device 103 can be representative of one or more client devices 103. The client device 103 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 103 can also be equipped with networking capability or networking interfaces, including a localized networking or communication capability, such as a near-field communication (NFC) capability, radio-frequency identification (RFID) read or write capability, or other localized communication capability.

The client device 103 can execute client applications 218, the management component 224, and other components. Some client applications 218 and the management component 224 can access network content served up by the computing environment 203 or other servers, thereby rendering a user interface 106 on a display 241, such as a liquid crystal display (LCD), touch-screen display, or other type of display device. To this end, some client applications 218 can include a browser or a dedicated application, and a user interface 106 can include a network page, an application screen, or other interface. Further, the client applications 218 can include device email applications, management applications, enterprise applications, social networking applications, word processors, spreadsheet applications, media viewing applications, or other applications.

The messaging environment 206 can include a computing device, such as a server, or multiple computing devices working together, such as a server bank, server farm, or similar computing environment. The messaging environment 206 can perform email and chat server functions using Simple Mail Transfer Protocol (SMTP), Internet Message Access Protocol (IMAP), Post Office Protocol (POP), Extensible Messaging and Presence Protocol (XMPP), Internet Relay Chat (IRC) and/or other protocols.

The messaging environment 206 can execute an email service 244, a chat service 247, or other types of content providing services. The email service 244 can receive a request for email data 236 located in a content store 250 and provide the email data 236 in response. For example, the email service 244 can receive a request for emails from the client device 103 and provide copies of the emails to the client device 103 in response. Likewise, the chat service 247 can receive requests from the client device 103 for chat conversations stored in the content store 250 and provide the chat conversations to the client device 103 in response. The chat service 247 can further link chat conversations with specific emails or email threads as well as chat groups 262.

The content store 250 can include one or more data stores. These data stores can include files stored in a filesystem, relational databases, key-value data stores, or other types of data repositories. The content store 250 can include email data 236, chat data 239, and other types of messaging data. The email data 236 includes email content 253 for emails exchanged between senders and recipients. Related emails or email threads can be identified according to a conversation identifier (ID) 256. A conversation ID 256 includes a unique identifier that is assigned to an email and related messages included in the same thread. For example, when an email is generated, the email service 244 can assign a unique conversation ID 256 to the email.

The email content 253 can be stored and identified in the content store 250 according to the assigned conversation ID 256. If an email thread containing multiple emails that are related to an original email develops, the emails included in the email thread can be associated with the same conversation ID 256.

The chat data 239 corresponds to data of chat communications exchanged between entities with respect to different email messages. For example, a chat conversation between two recipients of an email message can include a discussion related to the content of the email message. The chat data 239 includes chat content 259 that is organized according to conversation IDs 256 of corresponding emails or email threads in order to link each chat conversation with an email or email thread.

The chat conversations can be further organized according to chat groups 262 based on the participants or entities included in a given chat communication. Each chat group 262 includes the chat content 259 of a given chat communication and entity identifiers 265 that identify the entities or participants for the given chat conversation. There can be multiple chat conversations associated with an email or email thread, and the different chat conversations can include a different subset of entities or participants that are associated with an email message. For example, if an email message is exchanged between four entities (e.g., three recipients and one sender), one chat conversation can include Recipient A and Sender A, and another chat conversation can include Recipient A and Recipient B.

Although the messaging environment 206 illustrates the email service 244 and chat service 247, and corresponding email data 236 and chat data 239, within a combined environment, it should be noted that the email service 244 and email data 236 can be associated with an email server, and the chat service 247 and chat data 239 can be associated with a chat server. In some examples, the email server and the chat server can be operated by an enterprise operating the management service, Internet service providers (ISPs) and/or other third-party entities. In some examples, the email server and the chat server are operated by a same provider. In other examples, the email server and the chat server are operated by different providers. The email server and the chat server can be located at different geographic locations.

Next, a general description of the operation of the various components of the networked environment 100 is provided. It should be noted that although the discussion of FIG. 2 discusses the client device 103 being enrolled in a management service 215, enrollment in a management service 215 is optional and is not a required for integration of the chat functionality in emails. In some examples, if a user is not enrolled in a management service 215, a user can provide authentication information to the mail server, chat server, or other type of server to authenticate the user to allow access to the chat data and the integration of the chat functionality.

To begin, a user can interact with a client application 218 to send, receive, and view emails. The client application 218 can render a user interface 106 that includes an inbox view showing a listing of emails in an email inbox. When a user selects a particular email to view, the client application 218 can authenticate the user. Authentication of the user indicates that the user is permitted to access enterprise data 221, chat data 239, email data 236, or other data. Authentication can be performed by the client application 218, management service, an email server, chat server, and/or other service or server.

For example, if the user or client device 103 is enrolled in a management service that is operated by an enterprise or other organization, the client application 218 can send a request to the management service 215 to authenticate the user. In this example, the management service 215 can determine if the user or client device 103 is currently enrolled in the management service 215 based on authentication information included in the request or stored in the computing environment 203. If the management service 215 determines that the user or client device 103 is enrolled in the management service, the management service 215 can notify the client application 218 that the user is authenticated.

In another example, an email server, chat server, or other type of server(s) can also authenticate a user or client device 103 to determine if the user or client device 103 has access to the enterprise data 221, chat data 239, email data 236, or other data. The client application 218 can send an authentication request to the one or more servers requesting authentication of the user or client device 103. In some examples, the request includes authentication data that is associated with the user that can be used to authenticate the user. In some examples, the client application 218 can authenticate the user without requesting authentication from an external server.

When the user is authenticated, the client application 218 can send a request to the chat service 247 for chat data 239. The request can include a conversation ID 256 that is unique to the email or email thread and an entity identifier 265 that is used to identify the user associated with the request. The chat service 247 can compare the conversation ID 256 to the conversation IDs 256 stored in the chat data 239 to determine if there is an established chat conversation associated with the email or email thread. If there is not an established conversation, the chat service 247 can notify the client application 218 that there is not an established chat conversation tied to the email or email thread. The client application 218 can then present the requested email message to the user.

If there is an established chat conversation, the chat service 247 can determine if the user is included as a participant of the established chat conversation by comparing the entity identifier 265 in the request with the stored entity identifiers 265. If there is a match, the chat service 247 provides the corresponding chat data 239 to the client application 218. Otherwise, the chat service 247 notifies the client application 218 that there is not an associated chat.

Upon receipt of chat data 239 from the chat service 247, the client application 218 can generate and render a user interface 106 that includes the requested email message and further includes a messaging component 109 that indicates an active chat conversation that is linked to the email message. A user can select the messaging component 109 to view the corresponding chat conversations.

In some examples, a chat conversation may not be established and the user would like to communicate with another entity associated with the email message without creating a new email. In this situation, a user can request to initiate a chat conversation with another user via an interaction with the user interface 106. Upon receipt of a request to initiate a chat conversation, the client application 218 can render a user interface 106 that allows a user to create and engage in a chat conversation with another entity. The client application 218 can obtain chat data 239 in response to the interactions with the user interface and transmit the chat data 239 to the chat service 247 for storage.

In the event that a user deletes an email that has a corresponding chat conversation, the client application 218 receives a request to delete the email message. The client application 218 can then send a notification to the chat service 247 requesting the chat service 247 to remove the chat data associated with the user and linked to the email message. In this situation, the chat service 247 can delete the chat conversation that is associated with the user who deleted the message. However, if another participant in the chat conversation has not deleted the email, the other participant can still have access to the chat conversation.

In some situations, a user can add an additional entity to an already established chat conversations. When a user is added to an already established chat conversation, the user may not be able to view the prior conversations that were conducted between the original participants of the chat conversation because the prior conversations can be encrypted such that the added participant is unable to access the prior conversation.

Figure 3A:
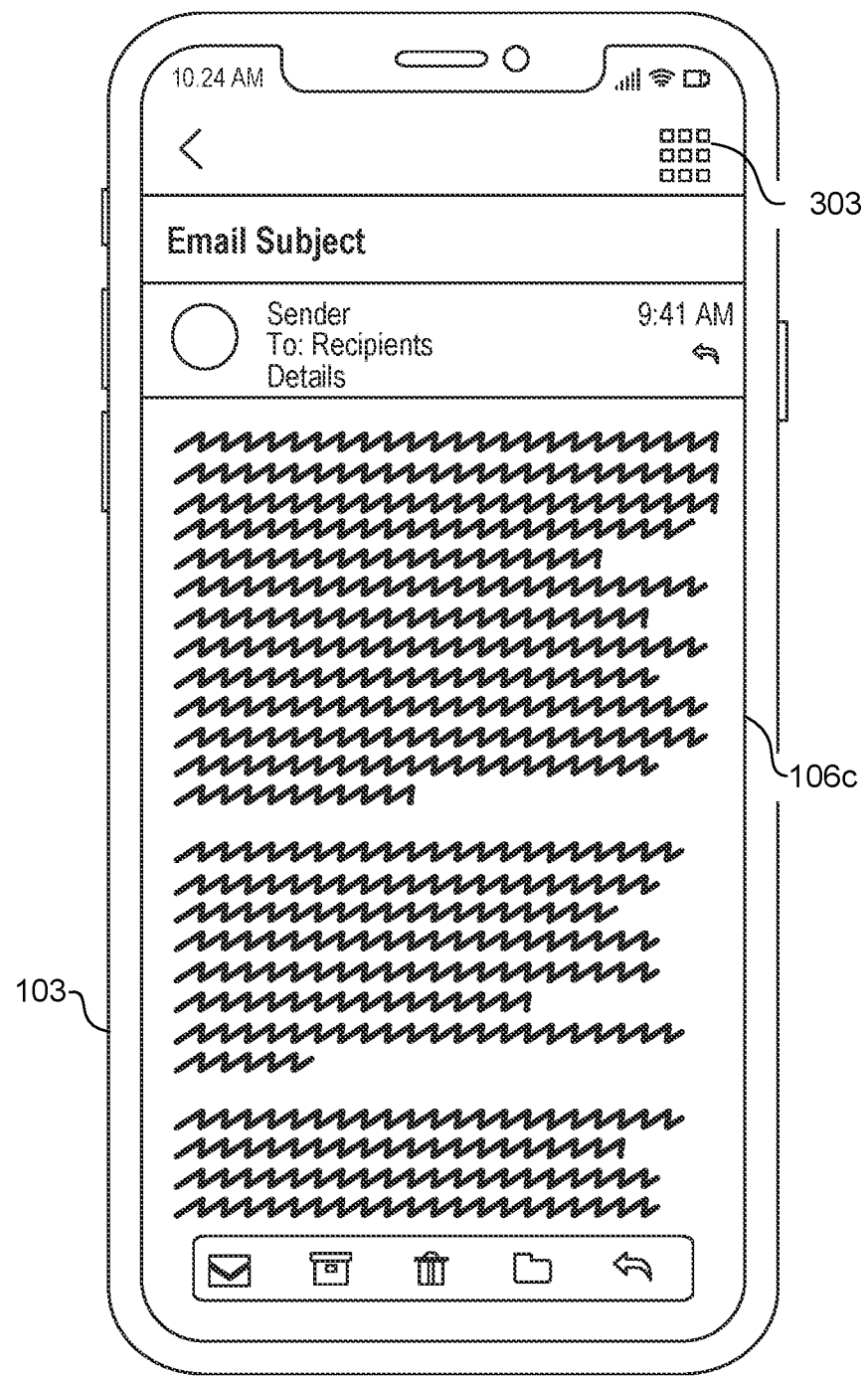
FIGS. 3A-3G are examples of user interfaces of a client application executed on a client device of the network environment of FIG. 1.

FIGS. 3A-3G illustrate examples of user interfaces 106 associated with the client application 218 executed on the client device 103. In particular, FIG. 3A illustrates an example of a user interface 106c rendered on a client device 103 that includes a display of an email message. The user interface 106c of FIG. 3A includes the email content 253 associated with the presented email. The user interface 106c further includes a menu component 303 that when selected can provide a user with different interactive options associated with the email. For example, the different interactive options can include moving the email message to a different folder, assigning a flag to the email message, marking the email message as spam, deleting the email message, imitating a chat conversation, or other options. The interactive options are discussed in further detail in FIG. 3B. The user interface 106c differs from the user interface 106a of FIGS. 1 and 3E in that the user interface 106c does not include a messaging component 109. User interface 106c can be presented when there is not an established chat conversation between the user and another party of the email conversation when the user views the email message. When there is not an established conversation, the messaging component 109 will not appear.

Figure 3B:
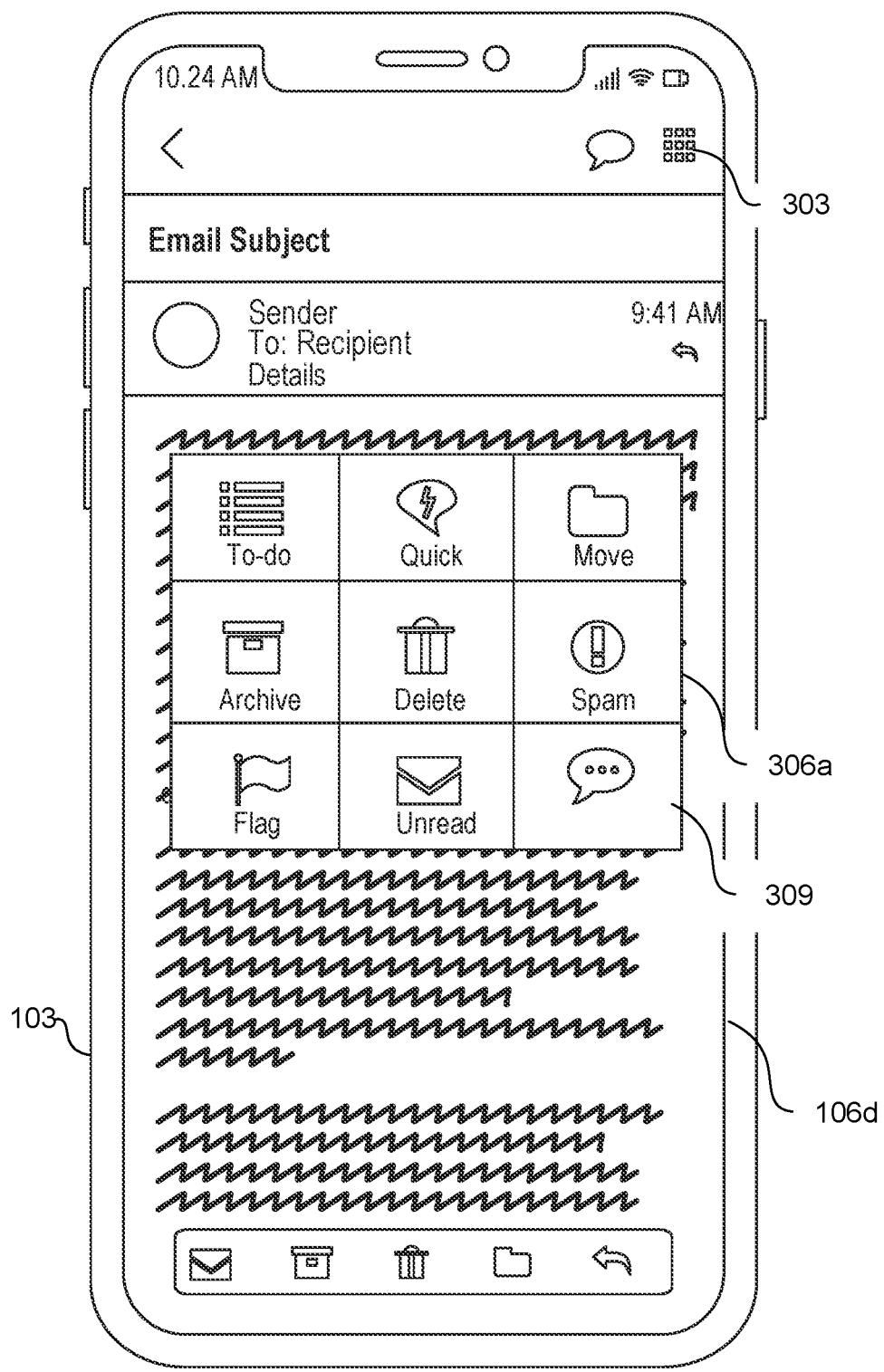

Moving on to FIG. 3B, shown is an example of the user interface 106d that illustrates a user interface element 306a that is visible upon selection of the menu component 303. The user interface element 306a can include a pop-up box, a moveable panel, or other type of user interface component. The user interface element 306a can provide the user with a listing of interactive options that, when selected, can cause the client application 218 to perform a task associated with the particular option. For example, the different interactive options can include moving the email message to a different folder, assigning a flag to the email message, marking the email message as spam, deleting the email message, initiating a chat conversation, or other options. In FIG. 3B, the interactive options are organized in a grid format and each interactive option corresponds to a selectable component. The interactive option associated with initiating a chat conversation is represented in FIG. 3B as selectable component 309.

Figure 3C:
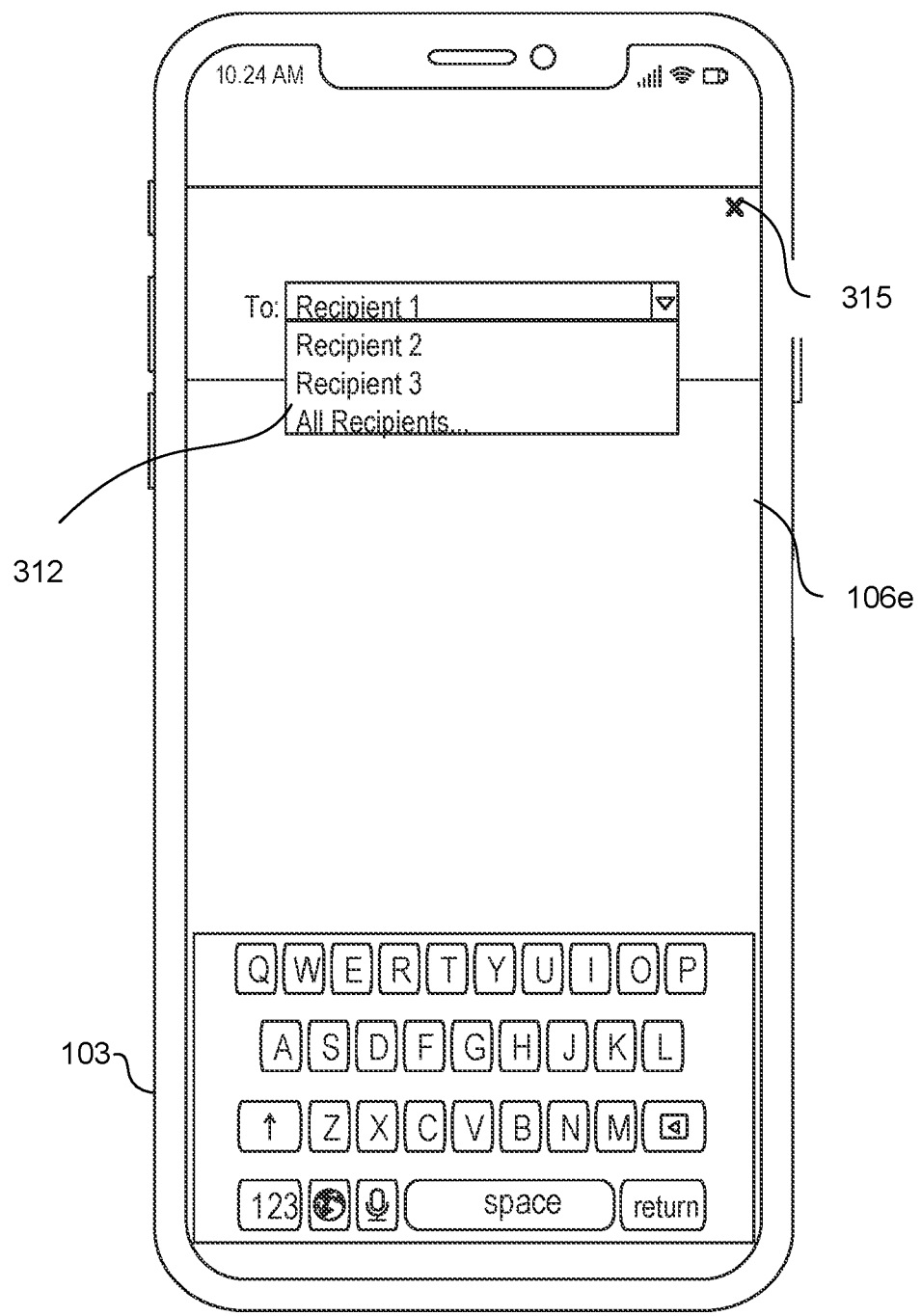

When a user selects the selectable component 309 to initiate a chat conversation with other parties associated with the email exchange, the client application 218 can generate a chat user interface 106e to establish a chat conversation with another party. FIG. 3C illustrates an example of the chat user interface 106e. The user interface 106e includes a group selection component 312 that allows the user to select one or more users to be included in the chat conversation. The group selection component 312 can include a listing of each participant included in the email exchange that can participate in a chat conversation. In some examples, all of the participants in the email exchange can engage in a chat conversation. In other examples, only a subset of the participants are able to engage in a chat conversation. For example, the chat feature may only be available to users who are enrolled in the management service operated by an enterprise. As such, only those users who are identified as being enrolled in the management service are included in the group selection component 312. While the group selection component 312 is illustrated as a drop-down box, it is understood that this component may include, buttons, a text input field, a text area, a check-box, and/or any other components.

The user interface 106e of FIG. 3C further includes a key pad and text input field sections that allow a user to input text for the chat conversation. The data received from interactions with the user interface 106e corresponds to chat data 239 that can be sent to the chat service 247 for storage. The user can select on the exit component 315 to return to the displayed email message.

Figure 3D:
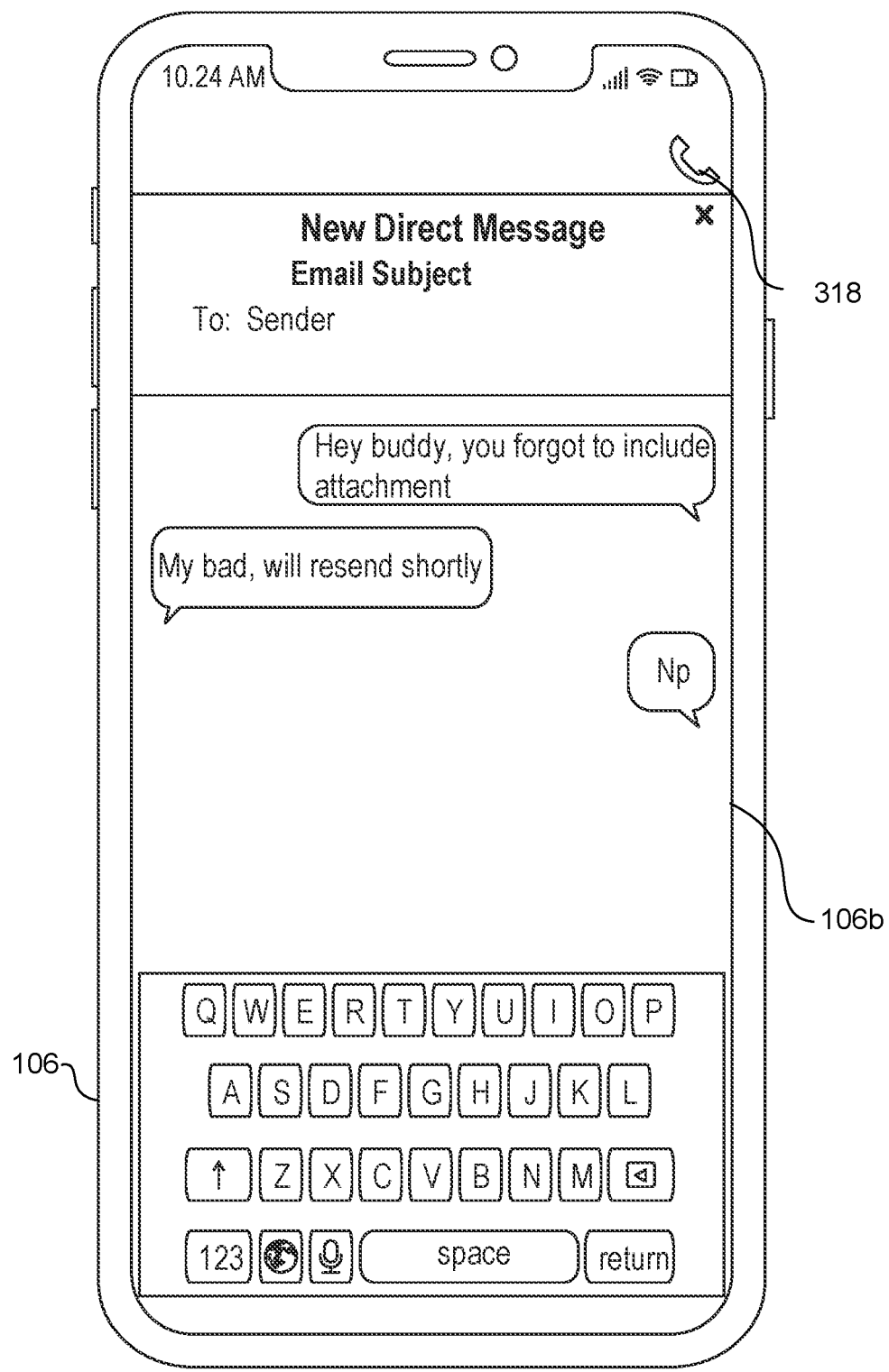

FIG. 3D illustrates an example of a chat user interface 106b that displays an established chat conversation between the user and the other party included in the chat conversation. In the example of FIG. 3D, the user is engaged in a chat conversation with the sender of the email message. As discussed, in FIG. 1, the chat user interface 106 displays a chat conversation that relates to the sender forgetting to include an attachment in the email shown in user interface 106a. As this comment is not necessary for all of the parties associated with the email, the chat feature allows the recipient the opportunity to contact to the sender without creating an additional email message in the thread or a separate email. The chat user interface 106b of FIG. 3D further includes a call component 318. If a telephone number for the other party is available, the client application 218 can include the call component 318. When a user selects the call component 318, the client application 218 can initiate a phone call between the user and the other party.

Figure 3E:
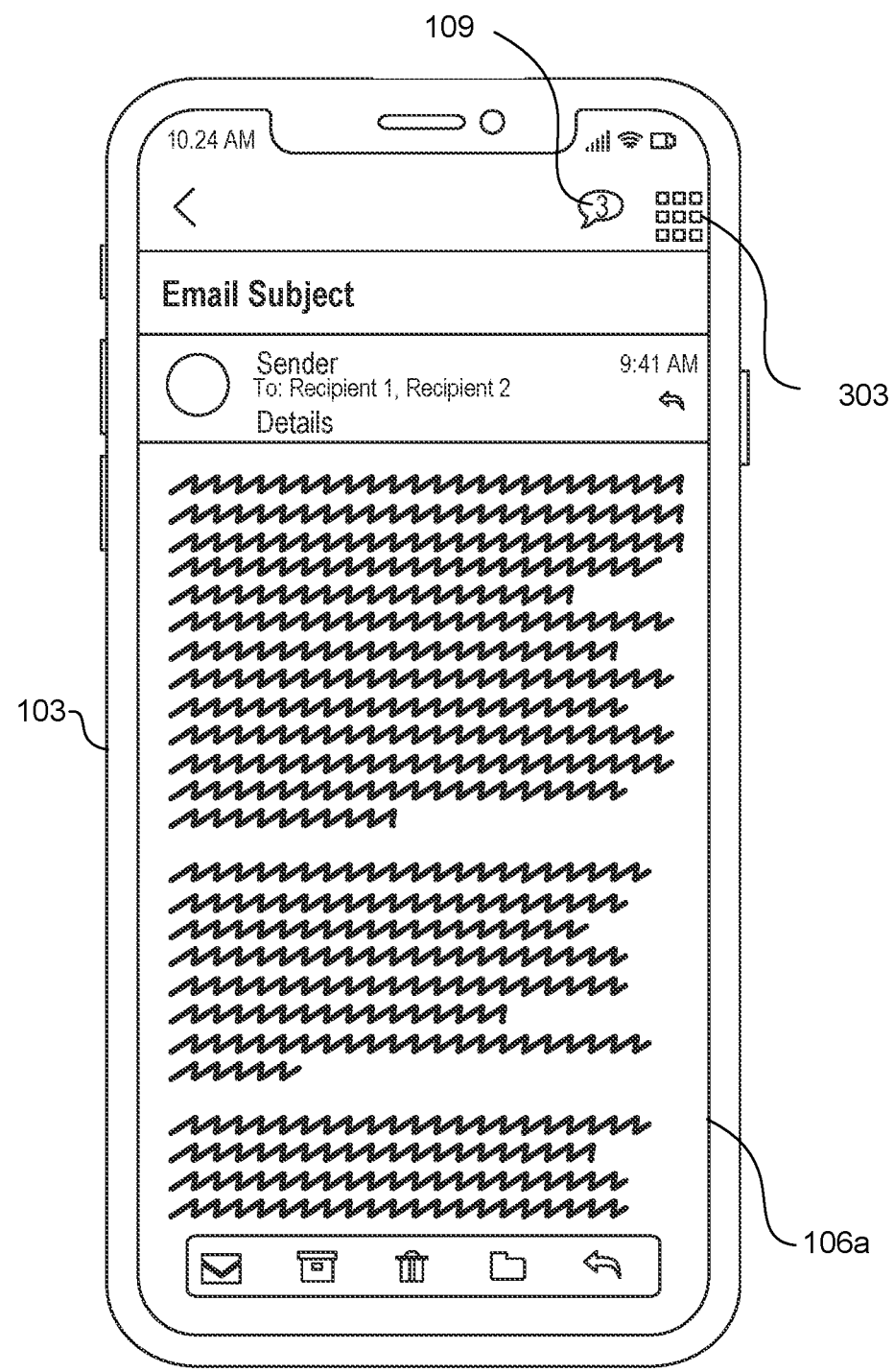

FIG. 3E illustrates an example user interface 106a that includes the email content 253 of the email message, a messaging component 109 and a menu component. The user interface 106a can be displayed to a user in response to the user requesting to view the email message. The messaging component 109 indicates that there is an established chat conversation between the user and at least one other party associated with the email message. As shown in FIG. 3A, the messaging component 109 is not included when a chat conversation has not been established between the user and another party. The user interface 106a further includes a menu component 303 that when selected can provide a user with different interactive options associated with the email message. One of the interactive options can include a request to initiate a chat conversation with another party of the email message.

Figure 3F:
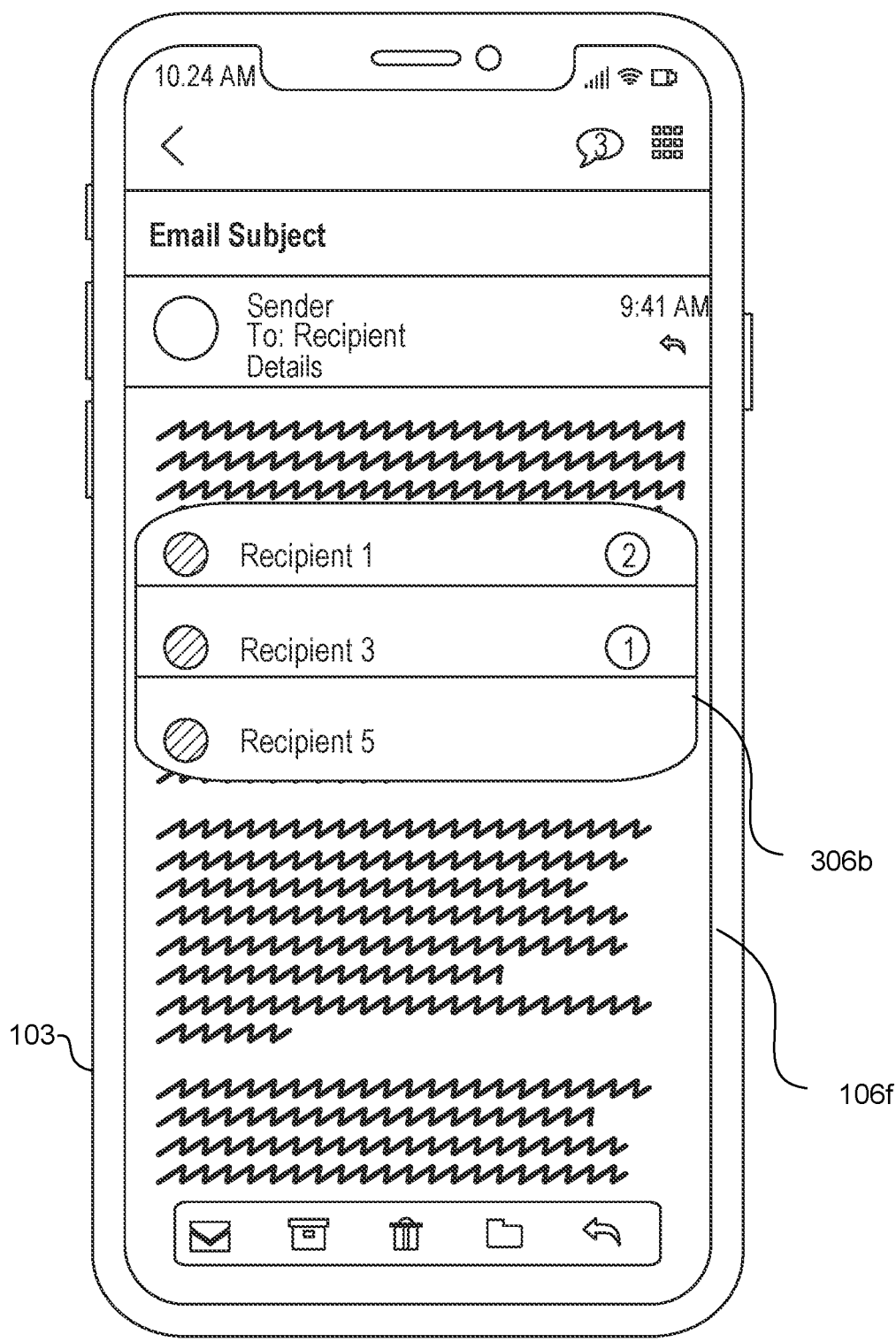

FIG. 3F illustrates an example of a user interface 106f that includes a user interface element 306b that can be visible upon selection of the messaging component 109. In the event that there are multiple chat conversations linked to a single email or email thread that includes the user, the user can be presented with a notification that allows the user to select which chat conversation they would like to view. In this example, the user interface element 306 includes a listing of three different chat conversations that are linked to the email or email thread. The user interface element 306 includes selectable components that a user can select to identify the conversation they would like to view. Although the selectable components associated with the different chat conversations are illustrated as buttons, it is understood that these components may include, a drop-down box, a text input field, a text area, a check-box, and/or any other components.

Figure 3G:
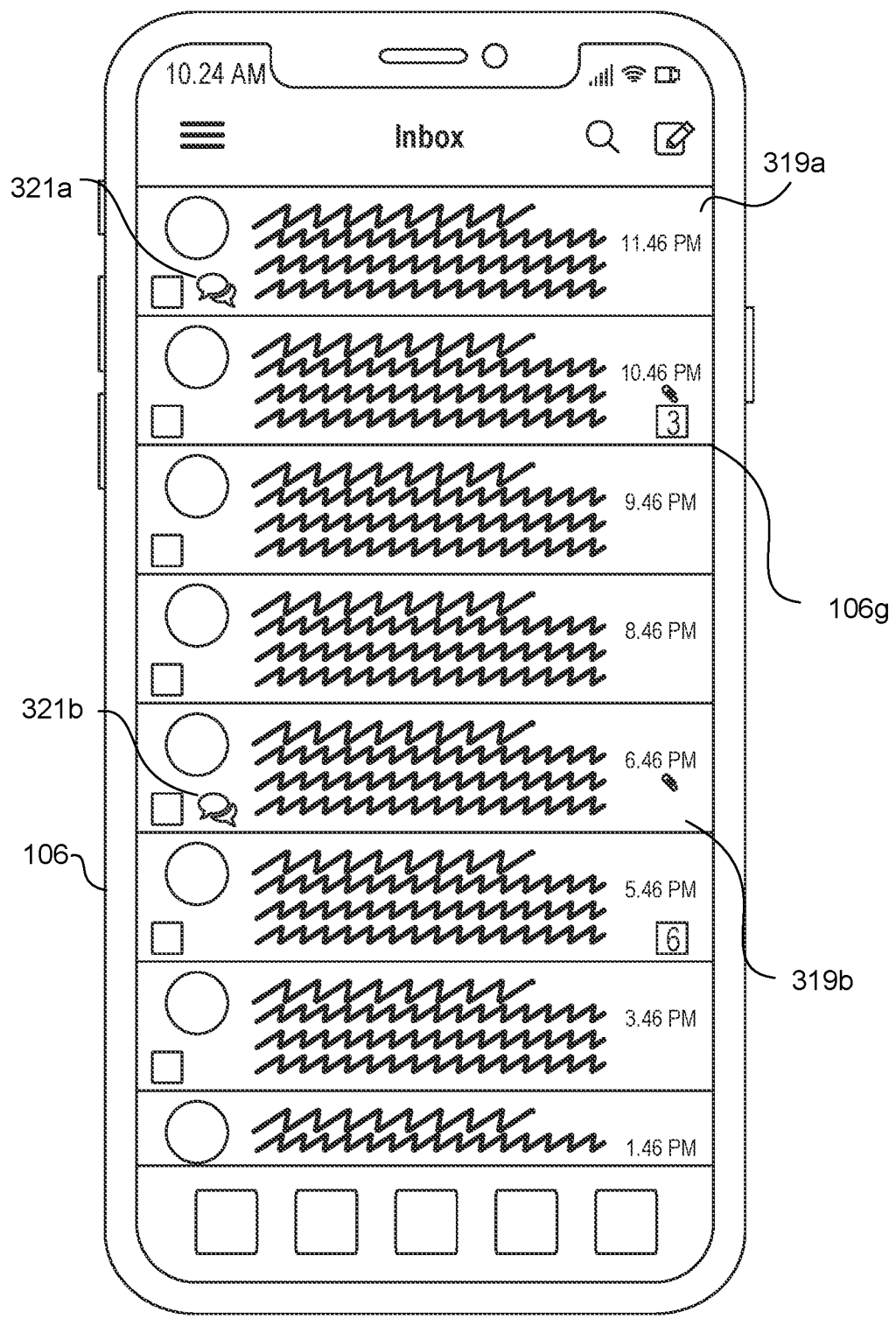

FIG. 3G illustrates an example user interface 106g that includes a listing of emails that are included in an email inbox. The user interface 106g includes a messaging icon 321 (e.g., 321a, 321b) displayed in the inbox view for each email conversation 319 (e.g., 319a, 319b) that is linked to an established chat conversation. The inclusion of the messaging icon 321 indicates to the user that there is an active chat conversation associated with the email conversation 319.

Figure 4:
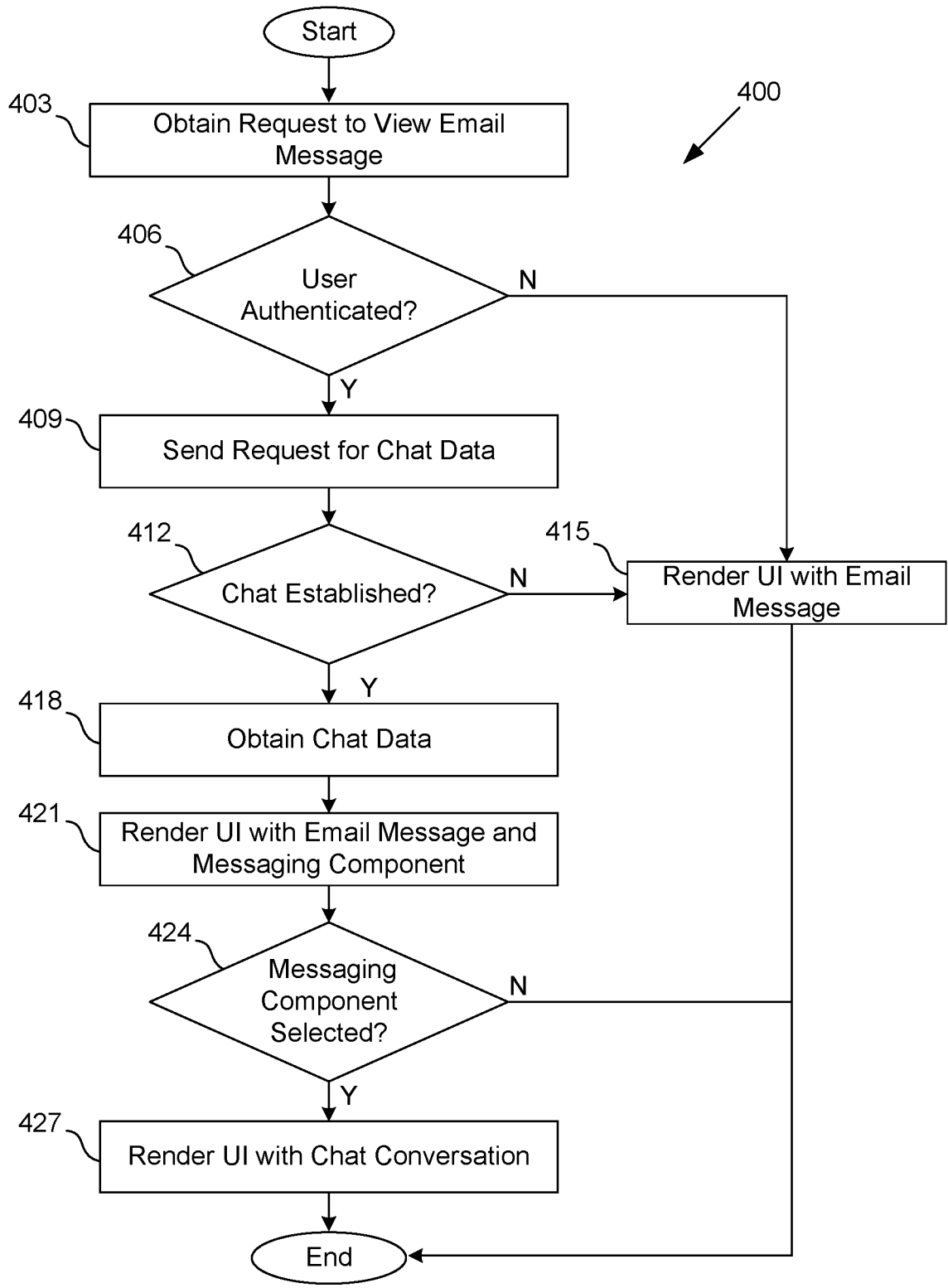
FIG. 4 is a flowchart depicting the operation of an example of a component of the client device of the network environment of FIG. 1.

Turning now to FIG. 4, shown is a flowchart 400 that provides one example of the operation of a portion of the client device 103.

Beginning at step 403, a client application 218 can obtain a request to view an email message. For example, the client application 218 can correspond to an email application or other type of application that facilitates sending, receiving, and viewing email messages. The request to view an email message can be received from a user interacting with a user interface 106 that presents a listing of emails including in an email inbox. The email message can be an email that is exchanged between multiple entities (e.g., recipients and sender) and the request can be obtained in response to a selection from a first entity (e.g., user of the client application 218).

At step 406, the client application 218 can determine if the user is authenticated. For example, the client device 103 can be enrolled in a management service 215 that is operated by an enterprise. As such, administrator-defined restrictions and limitations can be applied to the hardware and software of the client device 103 to permit secure access to sensitive material. In this example, an authenticated user is a user that is enrolled with the management service 215 and is permitted access to enterprise data 221, including the chat data 239.

To determine if a user is authenticated, the client application 218 can send a request to the management service 215 or other type of authentication service or server that can authenticate the user (e.g., the email server). The request can include authentication data that can be used to authenticate an end user or client device. The authentication data can include a user name, password, email address, biometric data, device identifier, registry identifier, authentication token, or other data. Using the authentication data provided by in the request, the management service 215 or other service or server can determine whether the user is enrolled in the management service 215 or otherwise authenticated. The management service 215 or other authentication service can send a notification to the client application 218 notifying the client application 218 whether the user or client device 103 is authenticated. The client application 218 can receive the notification, and if the user or client device 103 is authenticated, the process proceeds to step 409. Otherwise, the process proceeds to step 415.

At step 415, the client application 218 renders a user interface 106 that includes the email message but does not provide access to chats or chat capabilities. In this situation, the user is not allowed access to the chat conversations which can include sensitive enterprise information. In some examples, an unauthenticated user may not be allowed to have access to the email data 236. In this situation, instead of rendering a user interface 106 that includes the email message, the client application 218 can render a user interface 106 that includes a notification that the user is not permitted to view the selected email message. After step 415, this portion of the process proceeds to completion.

Returning to step 409, upon determining that the user is authenticated, the client application 218 sends a request to the chat service 247 for chat data 239 that is linked to the email message. The request for chat data 239 includes a conversation ID 256 that is associated with the selected email message. The request can also include an entity identifier 265 that is associated with the user (e.g., first entity). The chat data 239 can correspond to messages exchanged between the user and another entity included in the email message.

At step 412, the client application 218 determines if there is an established chat conversation for the selected email message and the requesting user. Upon receipt of the request from the client application 218, the chat service 247 determines whether there is a stored chat conversation that matches the conversation ID 256 and the entity identifier 265. If a chat conversation is established, the chat service 247 will send a notification to the client application 218 notifying the client application 218 of the established chat conversation. Otherwise, the chat service 247 will notify the client application 218 that there is not an established conversation. If there is an established chat conversation, the client application 218 proceeds to step 418. Otherwise, the client application 218 proceeds to step 415 where the client application 218 renders a user interface 106 that includes the email message.

At step 418, the client application receives the chat data 239 from the chat service 247. The chat data 239 includes data corresponding to the chat conversations between the user and another entity that are linked to selected email message. In some examples, the chat data 239 can include multiple chat conversations between the user and other entities associated with the email message. For example, there can be one chat conversation that is established between the user and the sender and another chat conversation between the user and another recipient of the email message. Upon receiving the chat data 239, the client application 218 proceeds to step 421.

At step 421, the client application 218 generates and renders a user interface 106 that includes the email content 253 of the email message and a messaging component 109. The messaging component 109 includes an identification of an established chat conversation.

At step 424, the client application 218 determines that the messaging component 109 has been selected. A user selection of the messaging component 109 can trigger a request to view the corresponding chat conversation. As such, selection of the messaging component 109 can provide access to the corresponding chat conversation. If a selection of the messaging component 109 is not received, this portion of the process proceeds to completion. Otherwise, the client application 218 proceeds to step 427.

At step 427, the client application 218 generates a user interface 106 that includes the chat content 259 associated with the established chat conversation thereby allowing the user to participate in the chat that is associated with the particular email. The client application 218 further renders the user interface 106 on a display 241 of the client device 103. In some examples, the user is included in multiple chat conversations that are associated with the selected email message. In this situation, the user can be requested to select a particular chat conversation to view upon selection of the messaging component 109. Upon rendering of the user interface 106, this portion of the process proceeds towards completion.

Figure 5:
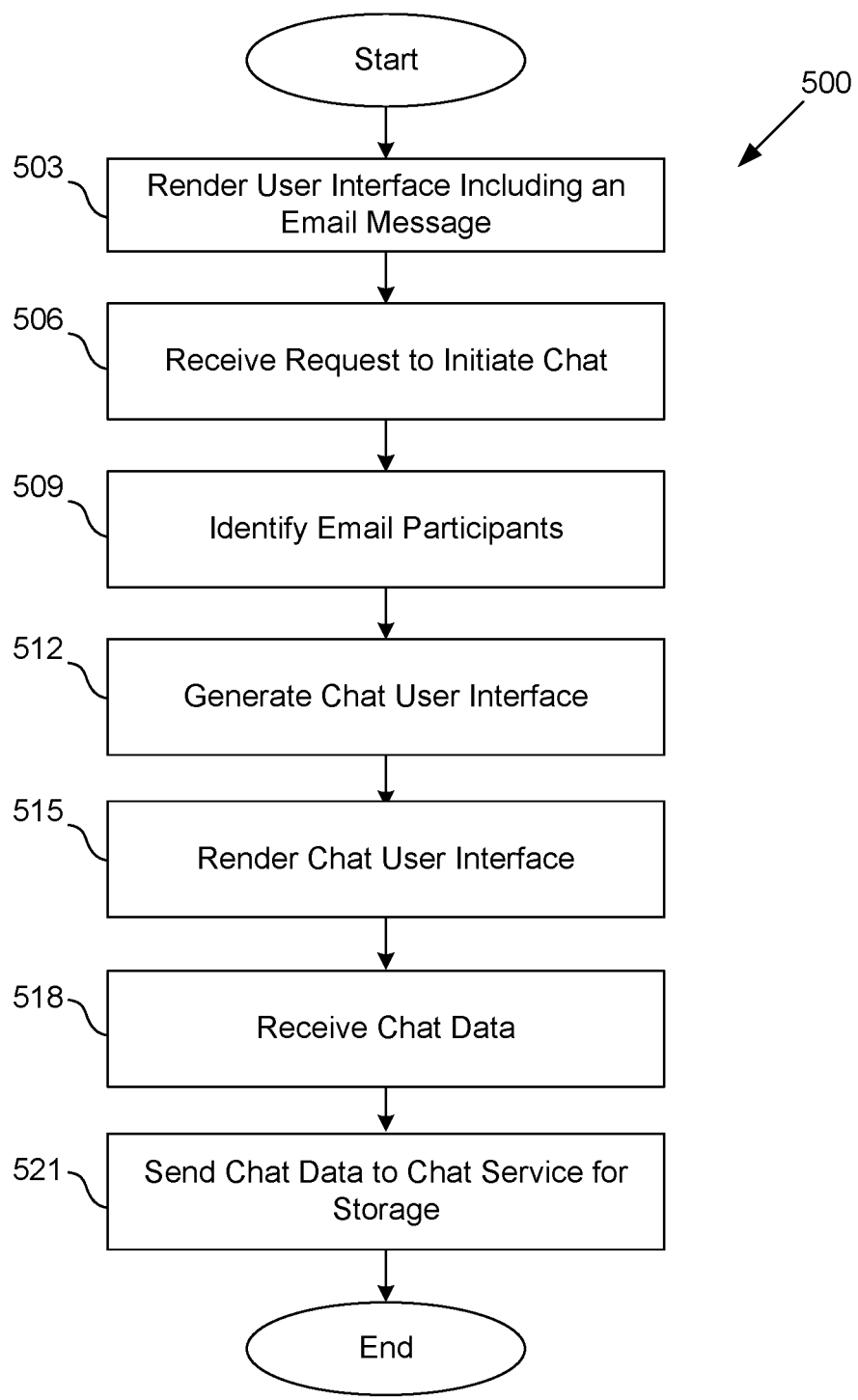
FIG. 5 is a flowchart depicting the operation of an example of a component of the client device of the network environment of FIG. 1.

Turning now to FIG. 5, shown is a flowchart 500 that provides one example of the operation of a portion of the client device 103.

Beginning at step 503, a client application 218 renders a user interface 106 that includes an email message. For example, the client application 218 can correspond to an email application or other type of application that facilitates sending, receiving, and viewing email messages. The user interface 106 can be rendered following a user selection of the email message from a listing of email messages presented in an email inbox.

At step 506, the client application 218 can receive a request to initiate a chat conversation. As shown in FIGS. 3A, 3B, 3E, and 3F, the user interface 106 can include a menu component 303 that, upon selection, can present the user with a user interface 106c that includes a listing of interactive components associated with the email message. One of the interactive components 309 can correspond to initiating a chat conversation. Selection of this interactive component 309 triggers the request to initiate the chat conversation.

At step 509, the client application 218 can identify the participants (e.g., recipients and sender) that are associated with the email exchange. This information can be included in metadata associated with the email message. For example, the metadata can include entity identifiers 265 that are uniquely associated with the different participants.

At step 512, the client application 218 can generate a chat user interface 106 that can facilitate entry of the chat data 239 by the user and allow the user to engage with a chat conversation with select recipients. The chat user interface 106 can include a group selection component 312 that presents a listing of the identified email participants and allows a user to select which participants to include in the chat conversation. In some examples, not all participants in the email exchange can participate in a chat conversation. For example, some participants in the email exchange can be associated with different network domains, email servers, or enterprises that do not support the chat functionality. In this situation, the client application 218 can determine which participants can engage in a chat conversation and then include only those identified participants in the listing of identified email participants.

For example, if the chat conversations are limited to only users that are associated with an enterprise and enrolled in the management service 215, the client application 218 can send a request including the entity identifiers 265 of the identifier email participants to the management service 215. The management service 215 can then notify the client application 218 which users have access to chat conversations.

In another example, the client application 218 can determine the network domains associated with the email participants based on the email metadata or other data. For example, the email addresses for each participant in the email or email thread can be used to identify a corresponding network domain. The client application 218 can determine which users have access to the chat feature according to the identified network domain.

At step 515, the client application 218 renders the chat user interface 106. As such, the user can interact with the user interface 106 to establish and engage in a chat conversation that is associated with the email message.

At step 518, the client application 218 receives the chat data 239 that is associated with the established chat conversation. The chat data 239 can include the selection of the participants of the chat conversation and the chat content 259 associated with the messages exchanged between the parties.

At step 521, the client application 218 sends the chat data 239 to the chat service 247 for storage. In particular, the client application 218 sends the chat data 239 along with the conversation ID 256 to the chat service 247 which can associate the chat conversation with the email message. The chat service 247 can further link the chat conversation to a particular chat group 262. After sending the chat data 239 to the chat service, this portion of the process proceeds to completion.

Figure 6:
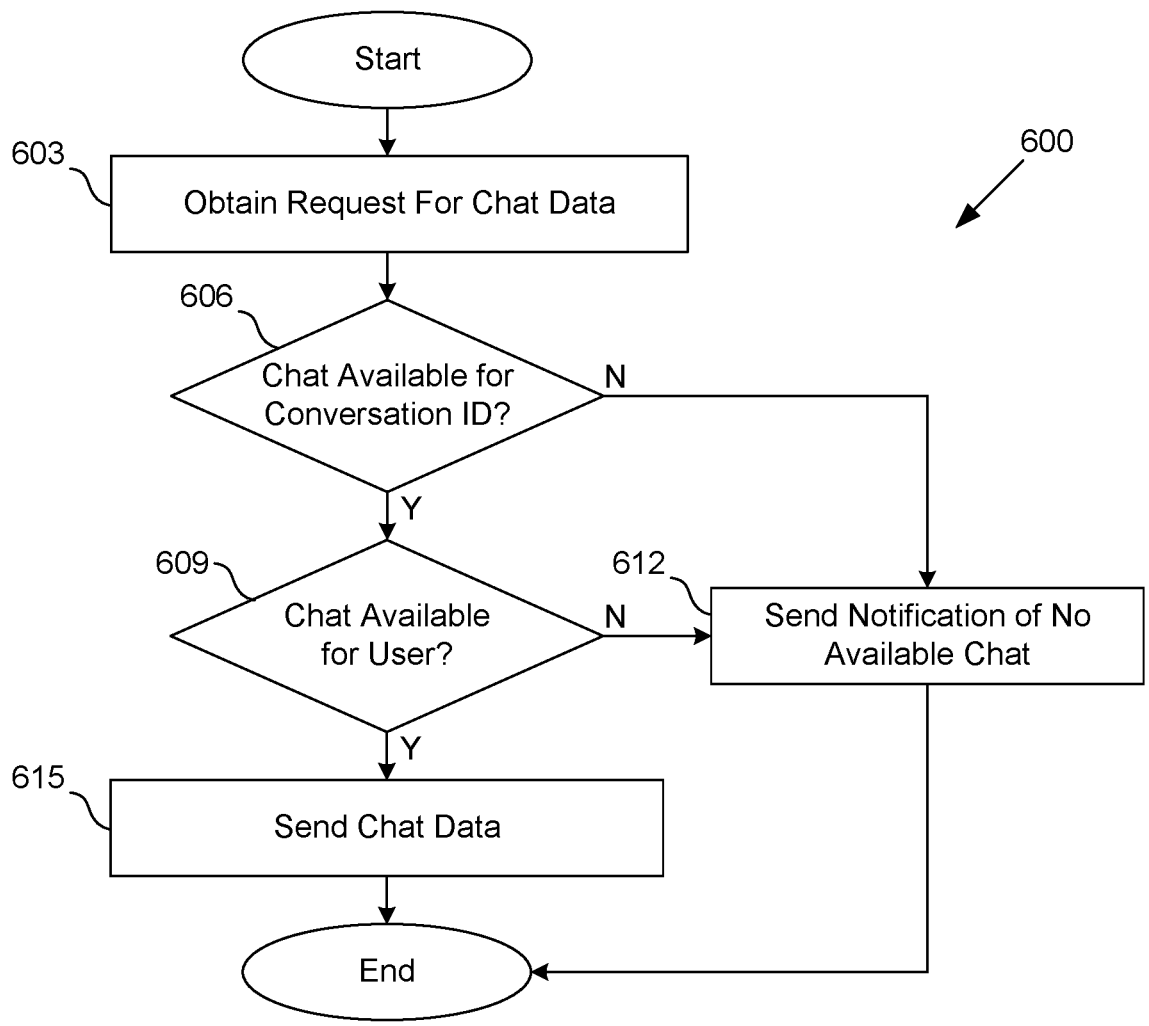
FIG. 6 is a flowchart depicting the operation of an example of a component of the messaging environment of the network environment of FIG. 1.

Turning now to FIG. 6, shown is a flowchart 600 that provides one example of the operation of a portion of the messaging environment 206.

Beginning at step 603, the chat service 247 obtains a request for chat data 239 from the client application 218. The request includes a conversation ID 256 and an entity identifier 265. The conversation ID 256 is a unique identifier that corresponds to a particular email message or email thread. The entity identifier 265 is a unique identifier that is associated with the user interacting with the client application 218.

At step 606, the chat service 247 determines whether there is a chat conversation available for the conversation ID 256 included in the request. For example, the chat data 239 can be organized according to conversation IDs 256. The chat service 247 can compare the conversation ID 256 in the request with the store conversation IDs 256 to determine if there is a match. If there is a chat conversation linked to the conversation ID 256, the chat service 247 proceeds to step 609. Otherwise, the chat service 247 proceeds to step 612.

At step 612, the chat service 247 sends a notification to the client application 218 notifying the client application 218 that there is not an established chat conversation associated with the conversation ID 256. Thereafter, this portion of the process proceeds to completion.

At step 609, the chat service 247 determines if there is an established chat conversation that is associated with the requesting user. For example, upon identifying chat conversations that are associated with the conversation ID 256, the chat service 247 can determine if the user is included in any of the chat groups 262 that have established chat conversations. If the entity identifier 265 matches any of the stored entity identifiers 265 that are associated with a chat group 262, the chat service 247 can determine that there is a chat conversation established for the requesting user. If there is an available chat conversation, the chat service 247 proceeds to step 615. Otherwise, the chat service proceeds to step 612.

At step 615, the chat service 247 sends the requested chat data 239 to the client application 218. The chat data 239 can include the chat content 259 and entity identifiers 265 that are associated with the chat conversations established for the corresponding email message and user. In some examples, the user can be a participant in multiple chat conversations with respect to a given email or email thread. When the user is included in multiple chat conversations, the chat data 239 can include data associated with the different conversations. In some examples, the chat service 247 can encrypt the chat data 239 prior to sending to the client application 218. The client application 218 can decrypt the chat data 239 prior to rendering. Upon sending the chat data 239 to the client application 218, this portion of the process proceeds to completion.

The flowcharts of FIGS. 4-6 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 4-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the computing devices or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions on an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for integrating chat conversations with email messages, the system comprising:
   at least one computing device; and
   at least one application executable in the at least one computing device, wherein, when executed, the at least one application causes the at least one computing device to at least:
      obtain a request for chat data from a client device associated with a user, the request including a conversation identifier (ID) of an email message received by the user;
      determine that the conversation identifier of the email message is associated with a plurality of stored chat conversations based on the plurality of stored chat conversations being organized in storage according to the conversation identifier of the email message;
      determine that the user is a participant of a particular stored chat conversation of the plurality of stored chat conversations; and
      transmit the chat data associated with the particular stored chat conversation to the client device.

2. The system of claim 1, wherein the request further includes a first entity identifier that is associated with the user, and determining that the user is the participant of the particular stored chat conversation comprises matching the first entity identifier included in the request with a second entity identifier that is associated with the particular stored chat conversation.

3. The system of claim 1, wherein the particular stored chat conversation comprises a first chat conversation, the plurality of stored chat conversations further comprise a second chat conversation, and the user is the participant in the first chat conversation and fails to be the participant of the second chat conversation.

4. The system of claim 1, wherein the client device is enrolled in a management service operated by an enterprise, and access to the chat data is controlled by the management service.

5. The system of claim 1, wherein the at least one computing device corresponds to a chat server managed by a first provider, and email data associated with the email message is stored in an email server that is managed by a second provider.

6. The system of claim 1, wherein, when executed, the at least one application causes the at least one computing device to at least:
   receive a request to remove the chat data associated with the user and linked to the email message; and
   delete the chat data associated with the user and linked to the email message.

7. The system of claim 1, wherein the particular stored chat conversation comprises a first stored chat conversation of the plurality of stored chat conversations that are linked to the conversation identifier and include the user as a respective participant, and transmitting the chat data comprises transmitting the chat data associated with the plurality of stored chat conversations to the client device.

8. A method for integrating chat conversations with email messages, the method comprising:
   obtaining, by at least one computing device, a request for chat data from a client device associated with a user, the request including a conversation identifier (ID) of an email message received by the user;
   determining, by the at least one computing device, that the conversation identifier of the email message is associated with a plurality of stored chat conversations based on the plurality of stored chat conversations being organized in storage according to the conversation identifier of the email message;

determining, by the at least one computing device, that the user is a participant of a particular stored chat conversation of the plurality of stored chat conversations; and transmitting, by the at least one computing device, the chat data associated with particular stored chat conversation to the client device.

9. The method of claim 8, wherein the request further includes a first entity identifier that is associated with the user, and determining that the user is the participant of the particular stored chat conversation comprises matching the first entity identifier included in the request with a second entity identifier that is associated with the particular stored chat conversation.

10. The method of claim 8, wherein the particular stored chat conversation comprises a first chat conversation, the plurality of stored chat conversations further comprise a second chat conversation, and the user is the participant in the first chat conversation and fails to be the participant of the second chat conversation.

11. The method of claim 8, wherein the client device is enrolled in a management service operated by an enterprise, and access to the chat data is controlled by the management service.

12. The method of claim 8, wherein the at least one computing device corresponds to a chat server managed by a first provider, and email data associated with the email message is stored in an email server that is managed by a second provider.

13. The method of claim 8, further comprising:

receiving, by the at least one computing device, a request to remove the chat data associated with the user and linked to the email message; and deleting, by the at least one computing device, the chat data associated with the user and linked to the email message.

14. The method of claim 8, wherein the particular stored chat conversation comprises a first stored chat conversation of the plurality of stored chat conversations that are linked to the conversation identifier and include the user as a respective participant, and transmitting the chat data comprises transmitting the chat data associated with the plurality of stored chat conversations to the client device.

15. A non-transitory computer readable medium for integrating chat conversations with email messages, the non-transitory computer readable medium comprising machine-readable instructions that, when executed by a processor of at least one computing device, cause the at least one computing device to at least:

obtain a request for chat data from a client device associated with a user, the request including a conversation identifier (ID) of an email message received by the user;

determine that the conversation identifier of the email message is associated with a plurality of stored chat conversations based on the plurality of stored chat conversations being organized in storage according to the conversation identifier of the email message;

determine that the user is a participant of a particular stored chat conversation of the plurality of stored chat conversations; and transmit the chat data associated with the particular stored chat conversation to the client device.

16. The non-transitory computer readable medium of claim 15, wherein the request further includes a first entity identifier that is associated with the user, and determining that the user is the participant of the particular stored chat conversation comprises matching the first entity identifier included in the request with a second entity identifier that is associated with the particular stored chat conversation.

17. The non-transitory computer readable medium of claim 15, wherein the particular stored chat conversation comprises a first chat conversation, the plurality of stored chat conversations further comprise a second chat conversation, and the user is the participant in the first chat conversation and fails to be the participant of the second chat conversation.

18. The non-transitory computer readable medium of claim 15, wherein the client device is enrolled in a management service operated by an enterprise, and access to the chat data is controlled by the management service.

19. The non-transitory computer readable medium of claim 15, wherein, when executed, the machine-readable instructions further cause the at least one computing device to at least:

receive a request to remove the chat data associated with the user and linked to the email message; and delete the chat data associated with the user and linked to the email message.

20. The non-transitory computer readable medium of claim 15, wherein the particular stored chat conversation comprises a first stored chat conversation of the plurality of stored chat conversations that are linked to the conversation identifier and include the user as a respective participant, and transmitting the chat data comprises transmitting the chat data associated with the plurality of stored chat conversations to the client device.

\* \* \* \* \*